United States Patent Office 2,738,305
Patented Mar. 13, 1956

2,738,305

CONTROLLED ENZYMOLYSIS OF HIGH-AMYLOPECTIN STARCH

Rolland L. Lohmar, Jr., and Francis B. Weakley, Peoria, Ill., and George E. Lauterbach, West Lafayette, Ind., assignors to the United States of America as represented by the Secretary of Agriculture No Drawing. Application October 1, 1954,
Serial No. 460,280

1 Claim. (Cl. 195—17)

(Granted under Title 35, U. S. Code (1952), sec. 266)

A non-exclusive, irrevocable, royalty-free license in the invention herein described, for all governmental purposes, with power to grant sublicenses for such purposes, is hereby granted to the Government of the United States of America.

This invention relates to the controlled degradation by enzymolysis of starches consisting essentially of amylopectin, such as waxy-corn starch. It relates more particularly to a method for the hydrolysis of such starch by means of an aqueous solution of $\alpha$-amylase, carried out in such a way that the physical and chemical characteristics of the resulting dextrin product is predictable.

The invention has among its objects a method of control applicable to the $\alpha$-amylase hydrolysis of high-amylopectin starch in aqueous solution so that the resulting dextrin, after isolation, possesses predetermined physical and chemical properties. Another object is to provide a simple method for following the course of such a hydrolysis so that the hydrolysis may be interrupted at any desired stage of amylopectin degradation.

The physical properties of dextrins, as obtained by the hydrolysis of starch, are known to be widely variable. The inherent viscosity, for example, of such a dextrin may vary quite considerably compared with the same property of a similar dextrin prepared under identical physical conditions. The same appears to be true of the fractional precipitability by ethanol and of such chemical properties as reducing power and periodate oxidation value.

Dextrins have found considerable use in foods and food compositions and in additive compositions. For such purposes it is ordinarily not necessary that the hydrolysis producing the dextrin be controlled within precise limits. However, there are some uses in which the chemical and physical properties, as enumerated above, must be controlled precisely. For example, it has been found that dextrin used in the fractionation of human blood must be an inherent viscosity of around 0.32.

As previously stated, dextrins prepared under substantially identical conditions of enzyme level, time, and temperature of conversion differ measurably in their inherent viscosities, but operating at extremely low enzyme levels better control may be obtained. We have found it, nevertheless, virtually impossible to obtain dextrins of given properties even though the conditions of enzymolysis were duplicated exactly. The variability between dextrins of different sources is great, and we have found that even such factors ar variation in degree of agitation of otherwise exactly duplicate conversions during the pasting step prior to hydrolysis affects the properties of the dextrins to a surprising degree.

According to this invention amylopectin conversions with $\alpha$-amylase are followed viscometrically, and the viscosity of the conversion liquor is used as a direct indication of the properties of the dextrin present therein. The invention is based upon our discovery that this easily made measurement provides a surprisingly reliable measure of the properties of the dextrin and is apparently independent of all the other factors heretofore known to affect the hydrolysis.

We have found in our research that the "relative viscosity" of the conversion liquor varies in a definite ratio with the inherent viscosity of the isolated dextrins, particularly when the inherent viscosity is in the range of about from 0.2 to .45, this ratio of the inherent viscosity to the "relative viscosity" being in the range of about from 0.131 to 0.138. We have found further that conversion mixtures having the same relative viscosity also are practically identical in the other physical and chemical properties enumerated above, within the expected experimental error of determination. Of these properties the inherent viscosity appears to be the most sensitive. This we believe to be surprising in view of the presence in the conversion mixture of appreciable quantities of hydrolysis by products such as oligosaccharides, and the like. Of all the factors available to the operator of such a conversion reaction, as a matter of fact, the relative viscosity appears to be the only reliable means of determining the extent of reaction.

By "relative viscosity" we refer to the ratio of the flow time in a pipette viscometrically of the conversion mixture at 60° C. to that of water at 60° C. Our invention is carried out by converting starch pastes with $\alpha$-amylase in the conventional manner, and following the course of conversion viscometrically. The relative viscosity value, selected from preestablished relationships, corresponding to the desired property of the dextrin being produced, provides a reliable end point for the conversion. When it is matched the enzyme is inactivated, and the dextrin isolated by conventional methods, as by ethanol precipitation.

The preestablishment of the relationship between relative viscosity and the properties of the dextrin may be carried out as follows:

EXAMPLE 1

A series of conversions were carried out on 4-percent pastes (100 grams of starch in 2.5 liters of water) at 60° C. and pH 6. Varying amounts of $\alpha$-amylase were added as shown in Table I, where the amylase is designated in SKB units. The results are given in Table I, wherein it will be noted that the relative viscosity within the range of approximately 1.5 to approximately 3.5 possess a nearly constant relationship to the sensitive inherent viscosity. From Table I it will be noted that the reaction time varied from 23 minutes to 4 hours, and that the amylase concentration varied from 0.036 unit per gram of starch to 0.218 unit per gram of starch yet this ratio relationship remained practically constant.

Table I.—α-amylase dextrinization of waxy-corn starch typical conversions

| Starch | Conversion ||||| Product ||||
|---|---|---|---|---|---|---|---|---|---|
| | Bonds broken, percent | Amylase units/g. of starch | Time, Min. | Relative viscosity at 60° | Inherent viscosity | Intrinsic viscosity | Reducing power [1] | Yield, percent | Ratio of inherent to relative viscosity |
| B | 0.31 | 0.036 | 141 | 3.78 | 0.460 | 0.420 | 1.1 | 91 | 0.122 |
| A | 0.33 | 0.036 | 150 | 3.38 | 0.445 | 0.438 | 1.0 | 88 | 0.132 |
| A | 0.32 | 0.036 | 240 | 2.83 | 0.370 | 0.360 | 1.2 | 87 | 0.131 |
| B | 0.50 | 0.218 | 23 | 2.63 | 0.351 | 0.332 | 1.1 | 89 | 0.135 |
| B | 0.50 | 0.073 | 147 | 2.38 | [2] 0.320 | 0.315 | 1.5 | 87 | 0.135 |
| B | 0.54 | 0.218 | 34 | 2.28 | 0.309 | 0.304 | 1.6 | 86 | 0.136 |
| B | 0.63 | 0.218 | 44 | 2.07 | 0.286 | 0.274 | 1.7 | 88 | 0.138 |
| B | 0.85 | 0.109 | 150 | 1.90 | 0.256 | 0.248 | 2.2 | 81 | 0.135 |
| B | 0.90 | 0.218 | 68 | 1.76 | 0.234 | 0.227 | 2.3 | 82 | 0.133 |
| A | 1.07 | 0.218 | 83 | 1.63 | 0.213 | 0.207 | 2.9 | 78 | 0.131 |
| B | 1.40 | 0.218 | 150 | 1.47 | 0.174 | 0.172 | 4.1 | 83 | 0.118 |
| B | 3.90 | 0.507 | 183 | 1.30 | 0.132 | 0.131 | 6.2 | 49 | 0.102 |

[1] As mg. maltose hydrate equivalent per g.
[2] The unfractionated hydrolyzate has an inherent viscosity equal to 0.289 and an intrinsic viscosity equal to 0.289.

EXAMPLE 2

A suspension was prepared of 100 grams waxy-corn starch (moisture content 13.68 percent) in 2.5 liters water. The suspension was heated until a paste formed and the paste then heated in an autoclave at 15 p. s. i. for 1 hour. The loss in weight (70 grams) due to evaporation was made up with water. The paste was then cooled to 60° C. and maintained at that temperature by means of a controlled temperature bath. α-amylase (18.75 units) was added, and the course of the conversion was followed by measuring the relative viscosity at 60° C. After 68 minutes a relative viscosity of 1.76 was obtained. The conversion was halted by addition of sulfuric acid to bring the pH to 4. After 15 minutes the pH was returned to 6 by addition of sodium hydroxide solution.

The product was precipitated by addition of an equal volume of alcohol. The precipitate was dissolved in a small volume of water and clarified in a supercentrifuge. The product was reprecipitated by adding the clarified solution to 5 volumes of alcohol. The purified product was filtered and dried in a conventional manner. The yield was 82 percent of the starting starch and the product had an inherent viscosity of 0.234 in water at 25° C.

EXAMPLE 3

A conversion was carried out as described in Example 2 except that 12.5 units enzyme were used. The relative viscosity was 1.75 after 150 minutes, whereupon the conversion was terminated and the product was isolated as in Example 2. It had an inherent viscosity of 0.232.

EXAMPLE 4

A paste was made of 8.54 pounds (dry basis) waxy-corn starch in 29.7 gallons of water by heating and stirring mixture at 204±4° F. for 1 hour. Calcium chloride (165 grams) was added and the pH was adjusted to 6. Two hundred eighty units α-amylase were added and the conversion was followed viscometrically. After 130 minutes the relative viscosity was 2.40, whereupon the conversion was stopped by bringing the pH to 4. The product was isolated and purified in the manner described in Example 2. The product had an inherent viscosity of 0.325 and weighed 7.02 pounds.

EXAMPLE 5

A starch paste was made up as described in Example 2. Conversion was carried out at 45° C. with 6.25 units α-amylase. After 112 minutes the relative viscosity was 3.80 when measured at 45° C. The product had an inherent viscosity of 0.427.

EXAMPLE 6

A conversion was carried out as in Example 5 except that half as much enzyme was used and the conversion was terminated at 150 minutes, when the relative viscosity was 3.63. The product, obtained in 92-percent yield, had an inherent viscosity of 0.430.

We claim:

The method for producing a dextrin of predetermined physical and chemical properties, said properties including a known predetermined inherent viscosity in the range of about from 0.2 to 0.45, which comprises hydrolyzing a pasted starch, said starch consisting essentially of amylopectin, with α-amylase at a temperature within the range of activity of said α-amylase, following the course of hydrolysis viscometrically and continuing said hydrolysis until the measured relative viscosity of the paste reaches a value such that the ratio of the predetermined inherent viscosity to the measured relative viscosity is in the range of about from 0.131 to 0.138, thereupon inactivating the α-amalyse and isolating the resulting dextrin from the reaction mixture.

References Cited in the file of this patent

Bernfeld: "Enzymes of Starch Degradation and Synthesis," Advances in Enzymology, vol. 12, 1951, pages 388–392.